(12) United States Patent
Zhao et al.

(10) Patent No.: US 10,920,806 B2
(45) Date of Patent: *Feb. 16, 2021

(54) SYSTEM FOR CONTROLLING DEFORMATION OF FLEXIBLE SCREEN

(71) Applicants: Kunshan New Flat Panel Display Tech. Cr. Co., Ltd., Jiangsu (CN); Kunshan Go-Visionox Opto-Electronics Co., Ltd., Jiangsu (CN)

(72) Inventors: Jingxun Zhao, Jiangsu (CN); Xiuqi Huang, Jiangsu (CN); Lei Xu, Jiangsu (CN); Rui Guo, Jiangsu (CN); Xinyu Qin, Jiangsu (CN); Fanzhong Bu, Jiangsu (CN)

(73) Assignees: Kunshan New Flat Panel Display Tech. Cr. Co., Ltd., Jiangsu (CN); Kunshan Go-Visionox Opto-Electronics Co., Ltd., Jiangsu (CN)

(*) Notice: Subject to any disclaimer, the term of this patent is extended or adjusted under 35 U.S.C. 154(b) by 128 days.

This patent is subject to a terminal disclaimer.

(21) Appl. No.: 16/289,108

(22) Filed: Feb. 28, 2019

(65) Prior Publication Data

US 2019/0234436 A1 Aug. 1, 2019

Related U.S. Application Data

(63) Continuation of application No. 15/535,892, filed as application No. PCT/CN2015/097432 on Dec. 15, 2015, now Pat. No. 10,274,994.

(30) Foreign Application Priority Data

Dec. 17, 2014 (CN) .......................... 2014 1 0789109

(51) Int. Cl.
*F15B 21/06* (2006.01)
*G09F 9/00* (2006.01)
(Continued)

(52) U.S. Cl.
CPC .......... F15B 21/065 (2013.01); G06F 1/1652 (2013.01); G06F 3/01 (2013.01);
(Continued)

(58) Field of Classification Search
CPC ............................ G06F 1/1652; G06F 1/1677
See application file for complete search history.

(56) References Cited

U.S. PATENT DOCUMENTS 5,810,126 A * 9/1998 Kordonsky ............. B32B 33/00
188/267
7,024,268 B1 * 4/2006 Bennett ............ G05B 19/41875
700/121
(Continued)

FOREIGN PATENT DOCUMENTS

| AU | 2003254810 A | 2/2004 |
|----|--------------|--------|
| CN | 1675969 A | 9/2005 |

(Continued)

OTHER PUBLICATIONS

China Patent Office Office Action for co-pending Chinese patent application s/n 201410789109.8 dated Mar. 5, 2019.
(Continued)

*Primary Examiner* — Chun-Nan Lin
(74) *Attorney, Agent, or Firm* — Seyfarth Shaw LLP

(57) ABSTRACT

The present disclosure relates to a system for controlling deformation of a flexible screen, configured to control the deformation of the flexible screen, the flexible screen including: a flexible screen body, a metal layer attached to a back surface of the flexible screen body, and a current controlled deformation layer coated on the metal layer; the flexible
(Continued)

screen further including a power supply circuit, and a current regulation circuit through which the power supply circuit is coupled to the metal layer; and the system including: a hardness regulation circuit, configured to control intensity of current flowing in the metal layer to soften the current controlled deformation layer. The above system for controlling deformation of a flexible screen can control the flexible screen to be deformed to have a desired shape.

4 Claims, 5 Drawing Sheets

(51) Int. Cl.
*G06F 1/16* (2006.01)
*G06F 3/01* (2006.01)
*G06F 3/041* (2006.01)
*G09F 9/30* (2006.01)
*G09G 3/20* (2006.01)

(52) U.S. Cl.
CPC .............. *G06F 3/041* (2013.01); *G09F 9/00* (2013.01); *G09F 9/301* (2013.01); *G09G 3/2092* (2013.01); *G06F 2203/04102* (2013.01)

(56) References Cited

U.S. PATENT DOCUMENTS

| | | | |
|---|---|---|---|
| 8,496,729 | B2 | 7/2013 | Kang et al. |
| 9,281,493 | B2* | 3/2016 | Guo .................. H01L 51/5212 |
| 2002/0190961 | A1* | 12/2002 | Chen ...................... G06F 3/044 345/173 |
| 2006/0099808 | A1 | 5/2006 | Kondo |
| 2006/0262098 | A1 | 11/2006 | Okamoto |
| 2009/0060249 | A1* | 3/2009 | Liou ........................ H04R 7/06 381/386 |
| 2010/0126716 | A1 | 5/2010 | Joseph |
| 2012/0075782 | A1 | 3/2012 | Wu et al. |
| 2012/0313862 | A1* | 12/2012 | Ko ...................... G09G 3/3433 345/173 |
| 2013/0229324 | A1* | 9/2013 | Zhang ..................... G09G 5/14 345/1.3 |
| 2013/0265221 | A1* | 10/2013 | Lee ........................ G06F 3/0416 345/156 |
| 2013/0265257 | A1* | 10/2013 | Jung ..................... G06F 3/0488 345/173 |
| 2013/0265262 | A1* | 10/2013 | Jung ..................... G06F 1/1652 345/173 |
| 2013/0321260 | A1* | 12/2013 | Joo ........................ G09G 5/005 345/156 |
| 2013/0329422 | A1 | 12/2013 | Park et al. |
| 2014/0028597 | A1* | 1/2014 | Cho ........................ G06F 3/017 345/173 |
| 2014/0054438 | A1 | 2/2014 | Yun et al. |
| 2014/0055344 | A1* | 2/2014 | Seo ........................ G06F 3/0487 345/156 |
| 2014/0078088 | A1* | 3/2014 | Seo ........................ G06F 1/1626 345/173 |
| 2014/0098075 | A1* | 4/2014 | Kwak ................. G06F 3/04845 345/204 |
| 2014/0101560 | A1* | 4/2014 | Kwak ................... G06F 1/1694 715/738 |
| 2014/0184479 | A1* | 7/2014 | Wu ........................ H05B 45/60 345/80 |
| 2015/0036064 | A1* | 2/2015 | Zhou ..................... G06F 3/0412 349/12 |
| 2015/0248034 | A1* | 9/2015 | Sugita .................... G02F 1/137 349/43 |
| 2016/0077553 | A1* | 3/2016 | Hyun ................... G09G 3/3208 345/690 |
| 2017/0229499 | A1 | 8/2017 | Du |

FOREIGN PATENT DOCUMENTS

| | | |
|---|---|---|
| CN | 101593020 B | 8/2011 |
| CN | 102419933 A | 4/2012 |
| CN | 103489380 A | 1/2014 |
| CN | 203689833 U | 7/2014 |
| CN | 104157660 A | 11/2014 |
| CN | 204087714 U | 7/2015 |
| EP | 2674807 A1 | 12/2013 |
| JP | 2003280546 A | 10/2003 |
| JP | 2004071765 A | 3/2004 |
| JP | 2013218696 A | 10/2013 |
| JP | 2013257564 A | 12/2013 |
| JP | 2016502156 A | 1/2016 |
| KR | 20050029285 A | 3/2005 |
| KR | 20140140944 A | 12/2014 |
| TW | 201009087 A | 3/2010 |
| TW | 201216230 A | 10/2010 |
| WO | 2004014115 A1 | 2/2004 |
| WO | 2014030957 A1 | 2/2014 |

OTHER PUBLICATIONS

European Patent Office Examination Report for co-pending EU patent application s/n 15869316.8, dated Jul. 24, 2020.
International Search Report for Application No. PCT/CN2015/097432 dated Mar. 11, 2016, 6 pages.
Search Report Chinese Patent Application No. 201410789109.8 dated Dec. 28, 2017, 7 pages.
First Office Action for Taiwan Patent Application No. 104142205 dated Sep. 26, 2016, 7 pages.
Second Office Action for Taiwan Patent Application No. 104142205 dated Dec. 29, 2016, 11 pages.
First Office Action Japanese Patent Application No. 2017-532720 dated Jun. 26, 2018, 3 pages.
Search Report for Japanese Patent Application No. 2017-532720 dated Jun. 22, 2018, 15 pages.
The Extended Search Report for European Patent Application No. 15869316.8 dated Jul. 24, 2018, 9 pages.
First Office Action for Korean Patent Application No. 10-2017-7018803 dated Apr. 17, 2018.
Written Opinion for Application No. PCT/CN2015/097432 dated Mar. 11, 2016, 4 pages.
First Office Action for Priority Chinese Patent Application No. 201410789109.8 dated Dec. 28, 2017.

* cited by examiner

SYSTEM FOR CONTROLLING DEFORMATION OF FLEXIBLE SCREEN

CROSS-REFERENCE TO RELATED APPLICATIONS

This application is a continuation of U.S. patent application Ser. No. 15/535,892, filed on Jun. 14, 2017, which is a 35 USC § 371 U.S. national stage filing of International Patent Application No. PCT/CN2015/097432 filed on Dec. 15, 2015, and claiming priority under the Paris Convention to Chinese Patent Application No. 201410789109.8 filed on Dec. 17, 2014, all of which are incorporated herein by reference for all that they teach and disclose without exclusion of any portion thereof.

FIELD

The present disclosure relates generally to the field of flexible display technology, and more particularly, to a system for controlling deformation of a flexible screen.

BACKGROUND

With the development of material technology, it is possible to make a screen into a flexible form. A device with flexible screen has many advantages, such as convenient carrying, being flexible, changing shape freely and so on. However, traditional devices with the flexible screen have some shortcomings at present, for example, the traditional device is poor in operability and practicability since the device does not have reliable support for the flexible screen, such that the characteristic of "flexible" cannot be highlighted.

The traditional way of solving the above-mentioned problem is to make the flexible screen attach on a support with a given shape (such as curved surface). But this way only makes use of good adhesion of the flexible screen, and the function of the flexible screen is limited to display on a curved surface, so the characteristic of flexible deformation of the flexible screen has not been fully used.

SUMMARY

Based on the above, a system for controlling deformation of a flexible screen is provided.

A system for controlling deformation of a flexible screen is provided, configured to control the deformation of the flexible screen, the flexible screen including: a flexible screen body, a metal layer attached to a back surface of the flexible screen body, and a current controlled deformation layer coated on the metal layer; the flexible screen further including a power supply circuit, and a current regulation circuit through which the power supply circuit is coupled to the metal layer; and the system for controlling the deformation of the flexible screen including:

a hardness regulation circuit, configured to control intensity of current flowing in the metal layer to soften or harden the current controlled deformation layer.

In an embodiment, the current controlled deformation layer is made up of a material selected from electrorheological fluid or complex of metal and water.

In an embodiment, the hardness regulation circuit includes:

a detection circuit, configured to detect a hardness regulation operation; and an explanation circuit, configured to receive the hardness regulation operation from the detection circuit, explain the hardness regulation operation, and generate a current regulation signal.

In an embodiment, the hardness regulation circuit further includes:

a driving circuit, configured to receive the current regulation signal from the explanation unit, and drive the current regulation circuit to output corresponding current based on the current regulation signal.

In an embodiment, the system further includes:

a display circuit, configured to display a hardness regulation operation interface on the flexible screen.

In an embodiment, the display circuit is further configured to draw an indicator which represents a current degree of hardness or softness, on the hardness regulation operation interface.

The above system for controlling deformation of a flexible screen can regulate the current flowing through the metal layer through the current regulation circuit, and provide the current required by the softening or hardening the current controlled deformation layer, so that the flexible screen can be deformed to form a required shape after being softened, and be hardened to have the required shape, to achieve the purpose of deformation.

DETAILED DESCRIPTION OF THE PREFERRED EMBODIMENTS

The present disclosure may be best understood by reference to the following description taken in conjunction with the accompanying drawings.

Figure 1:
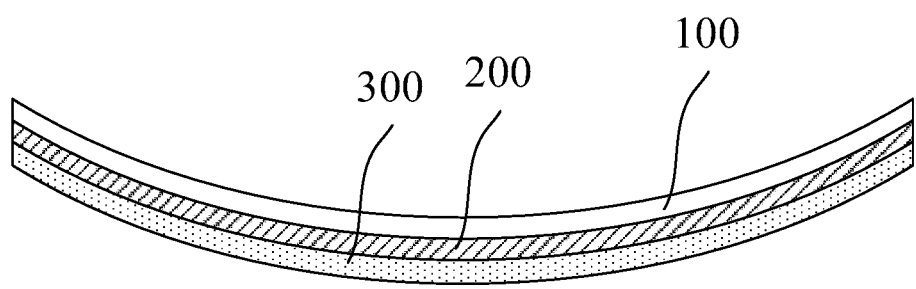
FIG. 1 is a schematic diagram showing layers of a flexible screen.

FIG. 1 is a schematic diagram showing layers of a flexible screen. The flexible screen 10 includes a flexible screen body 100, a metal layer 200 and a deformation material coating 300 arranged in a layered form.

The flexible screen body 100 is a flexible or foldable display structure made of a flexible material. The metal layer 200 is attached on a back surface of the flexible screen body 100, and positive and negative pins are lead out of the metal layer 200. The metal layer 200 may be powered from outside through the positive and negative pins. The metal layer 200 is fit together with the back surface of the flexible screen body 100, and the deformation material coating 300 is coated on the metal layer 200. The deformation material coating 300 is a current controlled deformation layer. The current controlled deformation layer is made up of a material the hardness of which can be changed by the intensity of the current passing through, for example, an electrorheological fluid, a complex of metal and water, or the like.

Figure 2:
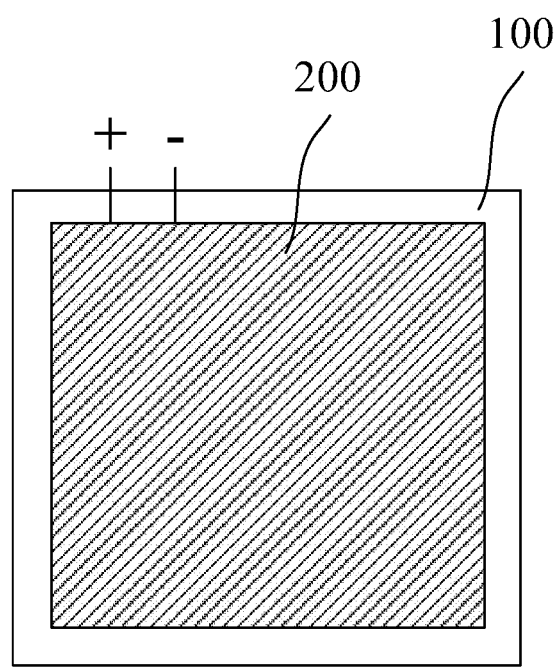
FIG. 2 is a diagram illustrating a sheet-like metal layer.
Figure 3:
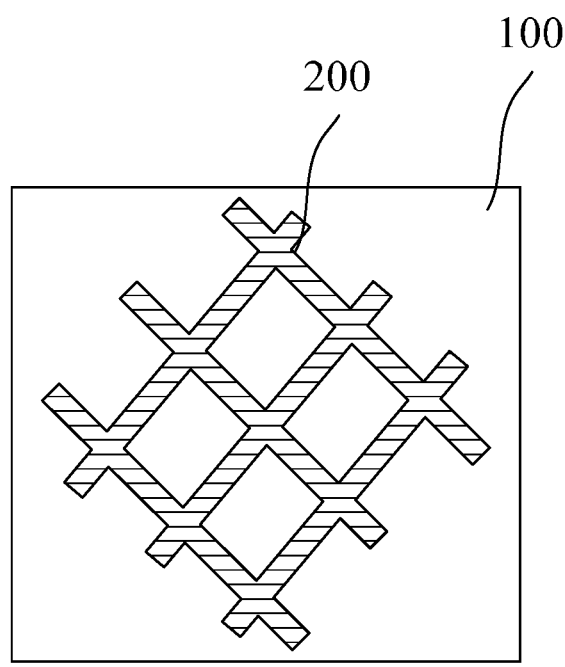
FIG. 3 is a diagram illustrating a net-like metal layer.

Specifically, as shown in FIG. 2, the metal layer 200 is a sheet-like metal layer of a thickness less than 20 micrometers, so the thin metal layer 200 will not affect the bending of the flexible screen body 100. As shown in FIG. 3, the metal layer 200 may be also formed in a structure of a metal net. The metal layer 200 may be formed on the back surface of the flexible screen body 100 through physical vapor deposition or silk-screen printing. The deformation material is subsequently prepared into a coating material which may be formed on the back of the flexible screen body 100 by coating, to form the deformation material coating 300.

The flexible screen 10 also includes a power supply circuit (not shown), and a current regulation circuit (not shown) through which the power supply circuit is coupled to the metal layer 200. When current passes through the metal layer 200, current also passes through the deformation material coating 300.

Figure 4:
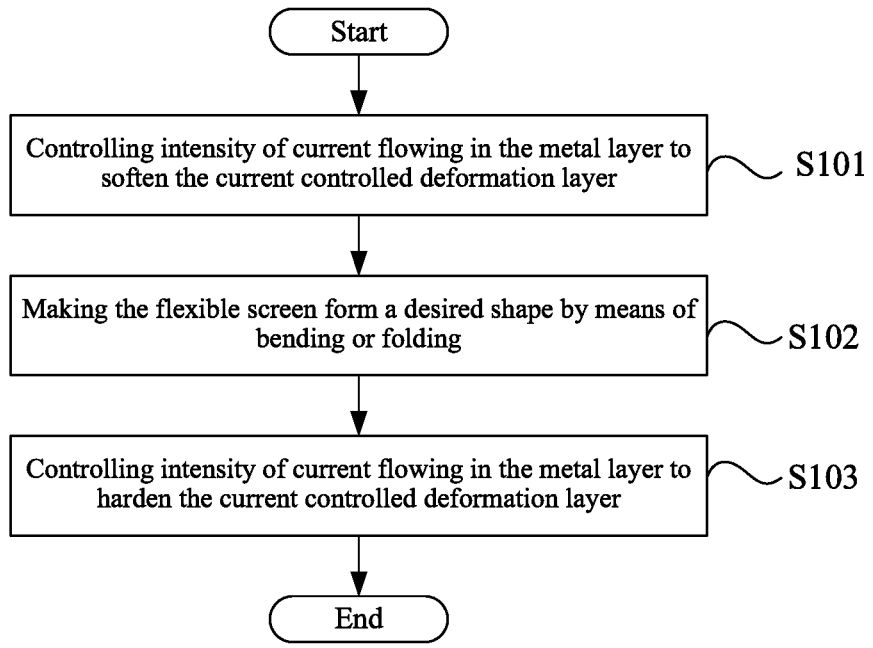
FIG. 4 is a flow diagram illustrating a method for controlling deformation of a flexible screen according to the present disclosure.

Based on structure of the above flexible screen 10, a method for controlling deformation of the flexible screen is provided. As shown in FIG. 4, the method includes the following steps.

Step S101: controlling intensity of current of the metal layer to soften the current controlled deformation layer. Based on the nature of the current controlled deformation layer, the current may be increased or decreased to soften the current controlled deformation layer. For example, in this embodiment, when the current is increased, the deformation material layer may be hardened; and when the current is decreased, the deformation material layer may be softened. In this case, the current is decreased in this step. And conversely, the current may be also increased in other embodiments.

Step S102: making the flexible screen form a desired shape by means of bending or folding. For example, the flexible screen may be bent to form a cylindrical surface. After the current controlled deformation layer being softened, the whole flexible screen 10 can also be bent or folded since both the metal layer 200 and the flexible screen body 100 are flexible or foldable. When the hardness of the deformation material coating 300 is regulated to a state in which the deformation material coating 300 is flexible or foldable, the flexible screen 10 can be bent as shown in FIG. 1.

Step S103: controlling intensity of current of the metal layer to harden the current controlled deformation layer. Based on the nature of the current controlled deformation layer, the current may be increased or decreased to harden the current controlled deformation layer. For example, in this embodiment, when the current is increased, the deformation material layer may be hardened; and when the current is decreased, the deformation material layer may be softened. In this case, the current is increased in this step. And conversely, the current may be also decreased in other embodiments. After the formation of the desired shape, the current controlled deformation layer may be hardened to make the flexible screen 10 be fixed in the desired shape. Further, when the hardness of the deformation material coating 300 is regulated to a state for supporting, the flexible screen 10 may be fixed in a state of support in which the flexible screen 10 may be form in a shape of V, in a shape of Z, in a shape of S or in another three-dimensional shape through folding once or more than twice.

Figure 5:
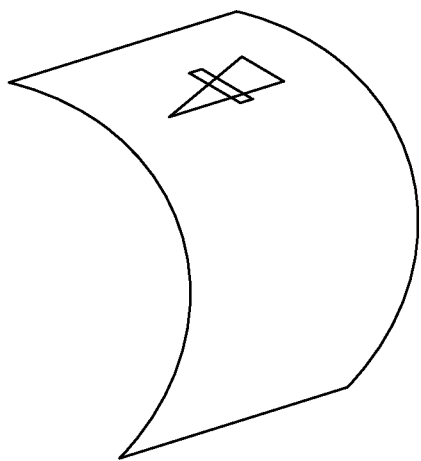
FIG. 5(a) and FIG. 5(b) are diagrams illustrating screens of two shapes respectively.
Figure 5:
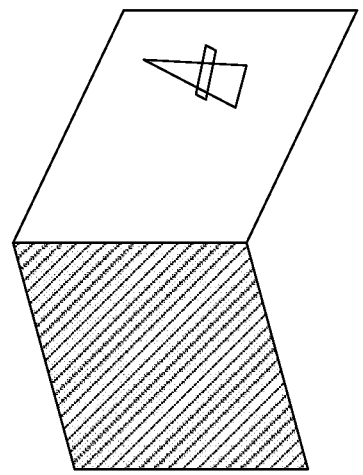

The flexible screen 10 may be form in a given shape through regulating the hardness of the deformation material coating 300. Specifically, first, the deformation material coating 300 may be regulated to be softened into a state in which the shape of the deformation material coating 300 can be changed freely, the whole flexible screen 10 then may be formed in a desired shape, and finally, the deformation material coating 300 may be regulated to be hardened so that the flexible screen 10 is fixed in the desired shape. For one example, as shown in FIG. 5(a), the flexible screen 10 is bent into a curved surface shape, the current is then regulated to harden the deformation material coating 300, and the shape of the flexible screen 10 is fixed in a curved surface shape. For another example, as shown in FIG. 5(b), the flexible screen 10 is bent to form two portions have a certain angle therebetween, the current is then regulated to harden the deformation material coating 300, and the flexible screen 10 is fixed in a bent shape.

Figure 6:
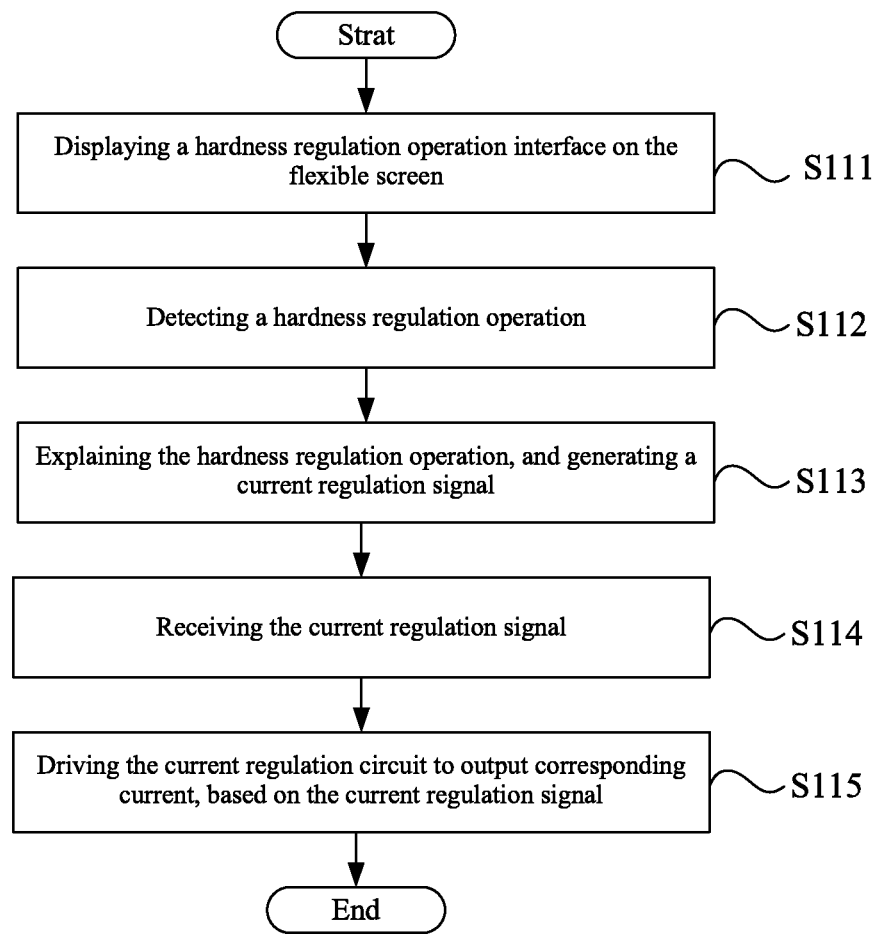
FIG. 6 is a flow diagram illustrating the step S101 or S103 in FIG. 4.

As shown in FIG. 6, the controlling intensity of current flowing through the metal layer in the step S101 and in the step S103 includes:

step S111: displaying a hardness regulation operation interface on the flexible screen;

step S112: detecting a hardness regulation operation, for example, a sliding touch operation or a mechanical button operation;

step S113: explaining the hardness regulation operation, and generating a current regulation signal;

step S114: receiving the current regulation signal; and step S115: driving the current regulation circuit to output corresponding current, based on the current regulation signal.

The step S111 may also include: drawing an indicator which represents a current degree of hardness or softness, on the hardness regulation operation interface.

Figure 7:
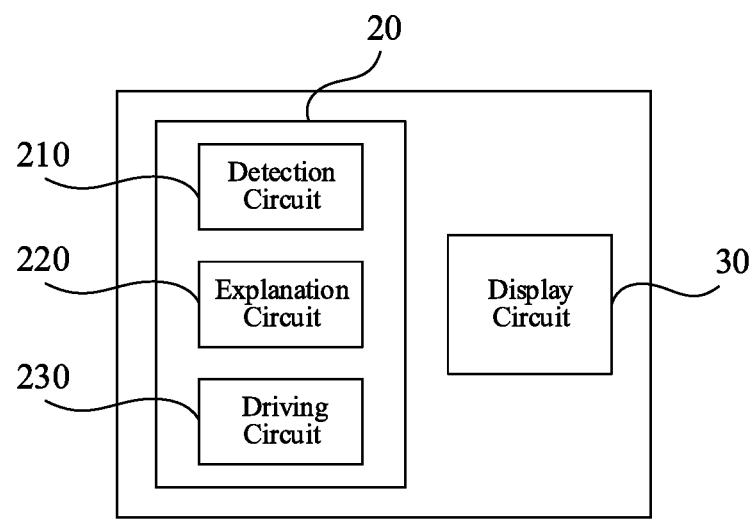
FIG. 7 is a diagram illustrating a system for controlling deformation of a flexible screen according to the present disclosure.

As shown in FIG. 7, the system for controlling the deformation of the flexible screen according to the present invention include: a hardness regulation circuit 20 and a display circuit 30. The hardness regulation circuit 20 is configured to control intensity of current flowing through the metal layer to soften or harden the current controlled deformation layer. The display circuit 30 is configured to display a hardness regulation operation interface on the flexible screen. The display circuit 30 is further configured to draw an indicator which represents a current degree of hardness or softness, on the hardness regulation operation interface.

The hardness regulation circuit 20 includes a detection circuit 210, an explanation circuit 220 and a driving circuit 230. The detection circuit 210 is configured to detect a hardness regulation operation. The explanation circuit 220 is configured to explain the hardness regulation operation and generate a current regulation signal. The driving circuit 230 is configured to receive the current regulation signal from the explanation circuit 220, and drive the current regulation circuit to output corresponding current based on the current regulation signal.

The above method and system for controlling deformation of a flexible screen can regulate the current flowing through the metal layer through the current regulation circuit, and provide the current required by the softening or hardening the current controlled deformation layer, so that the flexible screen can be deformed to form a desired shape after being softened, and be hardened to have the desired shape, to achieve the purpose of deformation.

The above methods and processes can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Technical features of the above embodiments may be combined arbitrarily. For brief description, not all of the possible combinations of the technical features of the above embodiments are described, but it will be appreciated that these possible combinations belong to the scope of the present disclosure once there is no conflict between the technical features.

The above are embodiments of the disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

The invention claimed is:

1. A system for controlling deformation of a flexible display screen, wherein the flexible display screen including a flexible screen body, a metal layer attached to a back surface of the flexible screen body, a current controlled deformation layer coated on the metal layer, a power supply circuit, and a current regulation circuit through which the power supply circuit is coupled to the metal layer, the system comprising:
- a detection circuit adapted to detect a hardness regulation operation;
- an explanation circuit adapted to receive the hardness regulation operation from the detection circuit, explain the hardness regulation operation, and generate a current regulation signal;
- a driving circuit adapted to receive the current regulation signal from the explanation circuit, and drive the current regulation circuit to output corresponding current based on the current regulation signal; and
- a hardness regulation circuit adapted to control intensity of current flowing in the metal layer to soften or harden the current controlled deformation layer.

2. The system of claim 1, wherein the current controlled deformation layer is made up of a material selected from the group consisting of electrorheological fluid or complex of metal and water.

3. The system of claim 1, further comprising
a display circuit adapted to display a hardness regulation operation interface on the flexible screen.

4. The system of claim 3, wherein the display circuit is further adapted to draw an indicator, which represents a current degree of hardness or softness, on the hardness regulation operation interface.

* * * * *